(12) United States Patent
Nau

(10) Patent No.: US 6,530,289 B2
(45) Date of Patent: Mar. 11, 2003

(54) NAVIGATION COMPUTER INTENDED FOR A MOTOR VEHICLE

(75) Inventor: Dieter Nau, Wetzlar (DE)

(73) Assignee: Siemens VDO Automotive AG, Munich (DE)

( * ) Notice: Subject to any disclaimer, the term of this patent is extended or adjusted under 35 U.S.C. 154(b) by 49 days.

(21) Appl. No.: 09/748,680

(22) Filed: Dec. 22, 2000

(65) Prior Publication Data

US 2001/0029795 A1 Oct. 18, 2001

(30) Foreign Application Priority Data

Dec. 23, 1999 (DE) .......................... 199 62 823

(51) Int. Cl.⁷ ............................................ G01C 19/02
(52) U.S. Cl. .......................................... 74/5.22; 74/5 R
(58) Field of Search .................... 74/5.22, 5 R; 403/83, 403/84, 85, 92, 93, 94, 96, 97

(56) References Cited

U.S. PATENT DOCUMENTS

| | | | | |
|---|---|---|---|---|
| 1,067,716 A | * | 7/1913 | Burdett ........................ | 74/5.22 |
| 2,047,613 A | * | 7/1936 | Brown ......................... | 403/97 |
| 5,600,870 A | * | 2/1997 | Fields et al. ............... | 403/97 X |
| 5,816,097 A | * | 10/1998 | Park ............................ | 74/5 R |
| 5,974,675 A | * | 11/1999 | Yamada et al. .......... | 74/5.22 X |

FOREIGN PATENT DOCUMENTS

| | | |
|---|---|---|
| DE | 198 33 157 A1 | 1/2000 |
| DE | 198 45 570 A1 | 4/2000 |
| JP | 10267660 | 10/1998 |
| JP | WO/99/02943 | 1/1999 |
| JP | 10019922 | 1/1999 |

* cited by examiner

*Primary Examiner*—Rodney H. Bonck
*Assistant Examiner*—Roger Pang
(74) *Attorney, Agent, or Firm*—Mayer, Brown, Rowe & Maw

(57) ABSTRACT

In the case of a navigation computer of a motor vehicle, the housing of a gyroscope is arranged in the housing wall of the navigation computer such that the angle of the gyroscope can be adjusted. For this purpose, the invention provides that the housing of the gyroscope has two mutually opposite spring tongues (5, 6) which are directed upward and simultaneously radially outward from the top side of the gyroscope, and the housing wall has a holder (2) with two opposite passages (7, 8) for pushing through the spring tongues (5, 6) and, adjacent in each case to the passages (7, 8), a rotary member (9, 10) each in the shape of a circular arc as bearing surface for the spring tongues (5, 6).

13 Claims, 1 Drawing Sheet

NAVIGATION COMPUTER INTENDED FOR A MOTOR VEHICLE

FIELD OF INVENTION

The invention relates to a navigation computer which is intended for a motor vehicle and has a gyroscope attached to a housing wall. The gyroscope is arranged in an adjustable separate housing and is aligned in a horizontal installation position in order to determine a vehicle rotation about its vertical axis.

BACKGROUND

Navigation computers with gyroscopes are being used increasingly in modern high-end motor vehicles, because they facilitate orientation in unknown areas. Such navigation computers are usually located in installation shafts on the dashboard. These installation shafts have different angular positions in different makes and vehicle models. The gyroscope, also termed a rate-of-rotation sensor, must always be horizontally aligned. Consequently when mounting the gyroscope on the housing wall of the navigation computer it is necessary to take account of the angular position of the installation shaft. The specialized mounting of the gyroscope constitutes a substantial outlay in terms of production engineering and limits the use of the navigation computer to one model of vehicle. In order to facilitate uniform production, it would be desirable to be able to use a gyroscope device which is always identical for differently inclined installation shafts.

Thus, there is a need for a navigation computer, intended for a motor vehicle which can be adapted with the lowest possible resource outlay to differently inclined installation shafts.

SUMMARY OF THE INVENTION

The present invention is embodied in a gyroscope housing arranged in the housing wall of a navigation computer such that the angle of the gyroscope can be adjusted.

Owing to this angular adjustability according to the invention, it is possible when installing the navigation computer to set the angular position of the housing of the gyroscope such that the gyroscope is aligned exactly horizontal in the final installed state of the navigation computer.

The angular adjustability can be achieved without a tool when the housing of the gyroscope has two mutually opposite spring tongues which are directed upward and simultaneously radially outward from the top of the gyroscope, and the housing wall has a holder with two opposite passages for pushing through the spring tongues. The housing wall has a rotary member in the shape of a circular arc as bearing surface for the spring tongues adjacent in each case to the passages. In the case of such a refinement of the invention, the means for angular adjustment simultaneously form a holder for the housing of the gyroscope which operates in the manner of a bayonet lock. This configuration allows the angular adjustment and the mounting and dismounting of the housing of the gyroscope without tools. Furthermore, this embodiment permits the angular position of the gyroscope to be set externally without opening the navigation computer.

The housing of the gyroscope can be fixed in several fixed angular positions when the rotary members have several latching indentations for rocking the spring tongues in fixed angular positions of the housing of the gyroscope.

When being inserted into the housing wall, the gyroscope housing is necessarily centered when, in accordance with another development of the invention, the rotary members run conically toward the side of the housing of the gyroscope, and the spring tongues respectively engage with their free end in the latching indentations.

The housing of the gyroscope latches particularly securely in the stampings, but can be rotated in a latching fashion upon appropriate use of force when the latching indentations are of trapezoidal cross section, and the free ends of the spring tongues are arcuately rounded.

The navigation computer is fashioned with particular advantage in terms of production engineering when a spring plate which has the two spring tongues is fastened on the topside of the housing of the gyroscope. Such a spring plate simultaneously forms an electromagnetic shield for the gyroscope.

In addition to the action by the conical rotary members, in accordance with another development of the invention it is possible to achieve a centering action since the top of the gyroscope housing has a central opening with a circular cross section, and the holder has a corresponding centering boss engaged in the circular opening.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

Figures 1, 2:
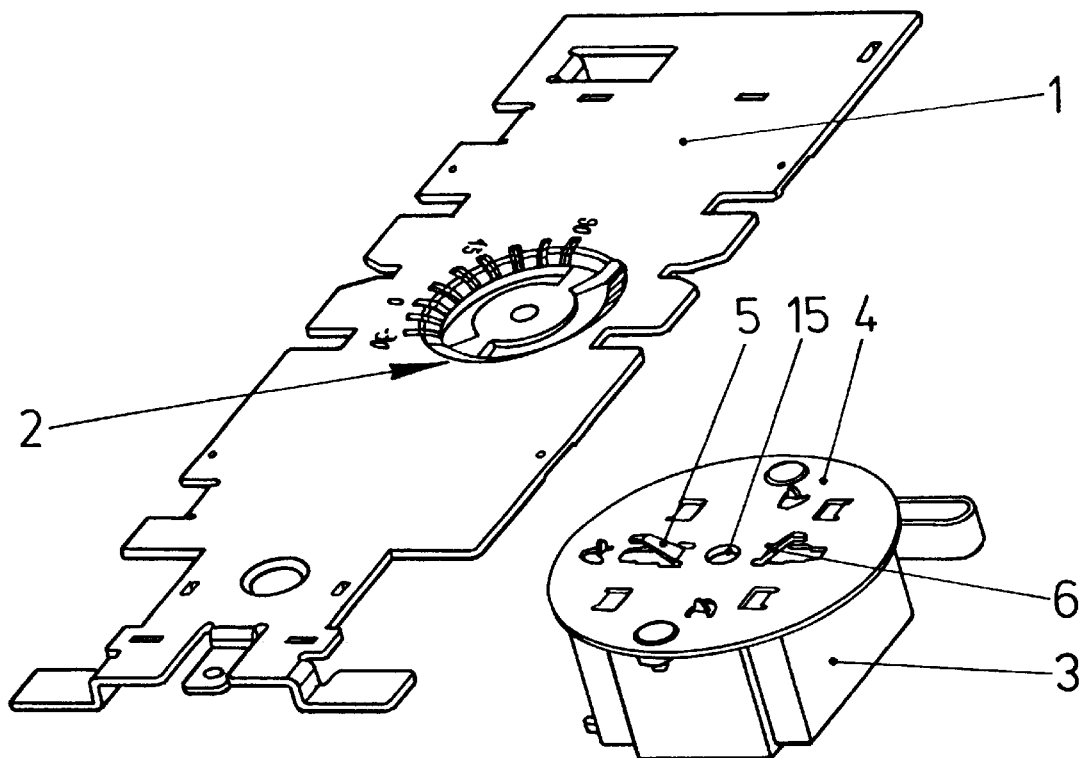
FIG. 1 shows a perspective representation of a housing wall of a navigation computer.
FIG. 2 shows a housing, to be fastened on the housing wall of a gyroscope.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Referring now to the drawings and more particularly to FIG. 1 which shows a housing wall 1 which has a holder 2 for a gyroscope housing 3. The holder 2 has a circular cross section as shown in FIG. 2. The gyroscope housing 3 is inserted from below into the holder 2.

As FIG. 2 shows, a spring plate 4 is fastened on the top side of the gyroscope housing 3. The spring plate 4 has two spring tongues 5 and 6 which are directed upward out of their plane and, simultaneously, radially outward.

Figure 3:
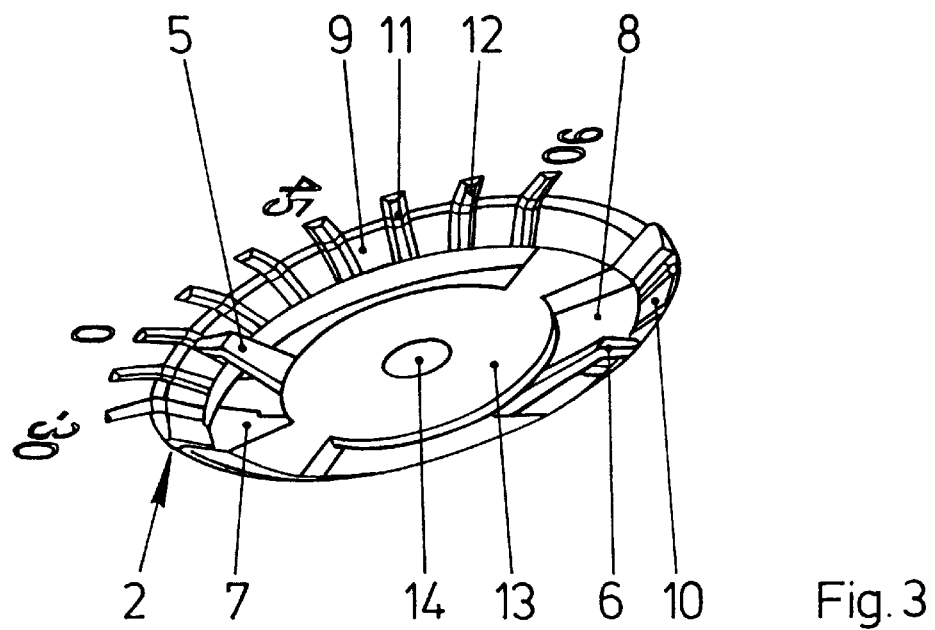
FIG. 3 shows an illustration, enlarged in scale by comparison with FIG. 1, of a holder in the housing wall for the housing of the gyroscope.

FIG. 3 shows that the holder 2 has two passages 7 and 8 through which the spring tongues 5 and 6 can be guided from below in one angular position of the gyroscope housing 3. If the gyroscope housing 3 is subsequently rotated, the spring tongues 5 and 6 each pass over a rotary member 9 and 10 respectively. The rotary members 9 and 10 are of conical design such that the gyroscope housing 3 is held in the manner of a bayonet. The two rotary members 9 and 10 each have a latching indentation 11 and 12 which both have a trapezoidal cross section into which the spring tongues 5 and 6 can latch with rounded, free ends.

It may be seen, in FIG. 3 that the holder 2 is bridged by a bearing plate 13 which has a central, downwardly directed centering boss 14. The centering boss 14 is dimensioned such that it is capable of engaging in a central opening 15 in the spring plate 4 of the gyroscope housing 3. The central opening 15 has a circular cross section as shown in FIG. 2, and is thereby capable of additionally centering the gyroscope housing 3 in the holder 2.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A navigation computer for a motor vehicle comprising:

a housing wall with a bearing surface;

a gyroscope attached to the housing wall;

a separate gyroscope housing holding the gyroscope and is aligned in a horizontal installation position in order to determine a vehicle rotation about its vertical axis; and wherein the gyroscope housing (3) is arranged in the housing wall (1) of the navigation computer such that the angle of the gyroscope can be adjusted; and wherein the gyroscope housing has spring tongues which may be locked on the bearing surface to fix the gyroscope housing at the adjusted angle.

2. The navigation computer as claimed in claim 1, wherein the spring tongues are mutually opposite and are directed upward and simultaneously radially outward from the top of the gyroscope, and the bearing surface has a holder (2) with two opposite passages (7, 8) for pushing through the spring tongues (5, 6) and a rotary member (9, 10) each in the shape of a circular arc adjacent to each passage.

3. The navigation computer as claimed in claim 2, wherein the rotary members have several latching indentations (11, 12) for locking the spring tongues (5, 6) in fixed angular positions of the gyroscope housing (3).

4. The navigation computer as claimed in claim 3 wherein the rotary members (9, 10) run conically toward the side of the gyroscope housing (3) and the spring tongue (5, 6) have a free end which is respectively engaged in the latching indentations (11, 12).

5. The navigation computer as claimed in claim 3, wherein the latching indentations (11, 12) have a trapezoidal cross section, and the free ends of the spring tongues (5, 6) are arcuately rounded.

6. The navigation computer as claimed in claim 5 including a spring plate (4) and wherein the two spring tongues (5, 6) are fastened on the top side of the gyroscope housing (3).

7. The navigation computer as claimed in claim 3 wherein the top side of the gyroscope housing (3) has a central opening (15) with a circular cross section, and wherein the holder (2) has a corresponding centering boss (14) engaging in the circular opening (15).

8. A navigation computer for a motor vehicle comprising:

a housing wall;

a gyroscope attached to the housing wall;

a separate gyroscope housing holding the gyroscope and is aligned in a horizontal installation position in order to determine a vehicle rotation about its vertical axis;

wherein the gyroscope housing (3) is arranged in the housing wall (1) of the navigation computer such that the angle of the gyroscope can be adjusted; and wherein the gyroscope housing (3) has two mutually opposite spring tongues (5, 6) which are directed upward and simultaneously radially outward from the top of the gyroscope, and the housing wall (1) has a holder (2) with two opposite passages (7, 8) for pushing through the spring tongues (5, 6) and a rotary member (9, 10) each in the shape of a circular arc adjacent to each passage as a bearing surface for the spring tongues (5, 6).

9. The navigation computer as claimed in claim 8, wherein the rotary members have several latching indentations (11, 12) for locking the spring tongues (5, 6) in fixed angular positions of the gyroscope housing (3).

10. The navigation computer as claimed in claim 9 wherein the rotary members (9, 10) run conically toward the side of the gyroscope housing (3) and the spring tongues (5, 6) have a free end which is respectively engaged in the latching indentations (11, 12).

11. The navigation computer as claimed in claim 9, wherein the latching indentations (11, 12) have a trapezoidal cross section, and the free ends of the spring tongues (5, 6) are arcuately rounded.

12. The navigation computer as claimed in claim 11 including a spring plate (4) and wherein the two spring tongues (5, 6) are fastened on the top side of the gyroscope housing (3).

13. The navigation computer as claimed in claim 9 wherein the top side of the gyroscope housing (3) has a central opening (15) with a circular cross section, and wherein the holder (2) has a corresponding centering boss (14) engaging in the circular opening (15).

* * * * *